US010423216B2

(12) United States Patent
Hooker et al.

(10) Patent No.: US 10,423,216 B2
(45) Date of Patent: Sep. 24, 2019

(54) ASYMMETRIC MULTI-CORE PROCESSOR WITH NATIVE SWITCHING MECHANISM

(71) Applicant: VIA TECHNOLOGIES, INC., New Taipei (TW)

(72) Inventors: Rodney E. Hooker, Austin, TX (US); Terry Parks, Austin, TX (US); G. Glenn Henry, Austin, TX (US)

(73) Assignee: VIA TECHNOLOGIES, INC., New Taipei (TW)

(*) Notice: Subject to any disclaimer, the term of this patent is extended or adjusted under 35 U.S.C. 154(b) by 341 days.

(21) Appl. No.: 14/077,740

(22) Filed: Nov. 12, 2013

(65) Prior Publication Data
US 2014/0298060 A1 Oct. 2, 2014

Related U.S. Application Data

(60) Provisional application No. 61/805,225, filed on Mar. 26, 2013.

(51) Int. Cl.
*G06F 9/46* (2006.01)
*G06F 1/3293* (2019.01)
*G06F 9/50* (2006.01)

(52) U.S. Cl.
CPC .......... *G06F 1/3293* (2013.01); *G06F 9/5044* (2013.01); *G06F 9/5094* (2013.01); *Y02D 10/22* (2018.01)

(58) Field of Classification Search
CPC .................. G06F 9/5083–5094; G06F 9/4893
See application file for complete search history.

(56) References Cited

U.S. PATENT DOCUMENTS

| 5,881,279 A * | 3/1999 | Lin | G06F 9/268 712/209 |
| 6,560,694 B1 * | 5/2003 | McGrath | G06F 9/30185 711/208 |

(Continued)

FOREIGN PATENT DOCUMENTS

CN 101790709 A 7/2010

OTHER PUBLICATIONS

The Shared-Thread Multiprocessor Jeffery A. Brown and Dean Tullsen Published: 2008.*

(Continued)

*Primary Examiner* — Emerson C Puente
*Assistant Examiner* — Paul V Mills
(74) *Attorney, Agent, or Firm* — McClure, Qualey & Rodack, LLP

(57) ABSTRACT

A processor includes first and second processing cores configured to support first and second respective subsets of features of its instruction set architecture (ISA) feature set. The first subset is less than all the features of the ISA feature set. The first and second subsets are different but their union is all the features of the ISA feature set. The first core detects a thread, while being executed by the first core rather than by the second core, attempted to employ a feature not in the first subset and, in response, to indicate a switch from the first core to the second core to execute the thread. The unsupported feature may be an unsupported instruction or operating mode. A switch may also be made if the lower performance/power core is being over-utilized or the higher performance/power core is being under-utilized.

9 Claims, 7 Drawing Sheets

(56) References Cited

U.S. PATENT DOCUMENTS

| | | | | |
|---|---|---|---|---|
| 2006/0095807 | A1* | 5/2006 | Grochowski | G06F 1/206 713/324 |
| 2006/0265576 | A1* | 11/2006 | Davis | G06F 9/3017 712/229 |
| 2007/0006231 | A1* | 1/2007 | Wang | G06F 9/30003 718/100 |
| 2007/0150895 | A1* | 6/2007 | Kurland | G06F 9/3009 718/102 |
| 2007/0283128 | A1* | 12/2007 | Hoshaku | G06F 1/3203 712/1 |
| 2009/0100250 | A1* | 4/2009 | Chen | G06F 9/45554 712/43 |
| 2009/0172369 | A1 | 7/2009 | Stillwell, Jr. et al. | |
| 2010/0242014 | A1 | 9/2010 | Zhu | |
| 2011/0231633 | A1* | 9/2011 | Grisenthwaite | G06F 9/3001 712/208 |
| 2012/0233477 | A1* | 9/2012 | Wu | G06F 1/3287 713/320 |
| 2012/0254877 | A1* | 10/2012 | Comparan | G06F 9/30043 718/102 |
| 2012/0291040 | A1 | 11/2012 | Breternitz et al. | |
| 2012/0317571 | A1 | 12/2012 | Chang | |
| 2013/0061237 | A1 | 3/2013 | Zaarur et al. | |
| 2013/0268742 | A1 | 10/2013 | Yamada et al. | |
| 2014/0026146 | A1* | 1/2014 | Jahagirdar | G06F 9/4856 718/105 |
| 2014/0082630 | A1* | 3/2014 | Ginzburg | G06F 15/7807 718/105 |
| 2014/0181830 | A1* | 6/2014 | Naik | G06F 9/461 718/104 |
| 2014/0189301 | A1* | 7/2014 | Gorbatov | G06F 1/3206 712/30 |

OTHER PUBLICATIONS

Microcode definition Retrieved from: http://www.webopedia.com/TERM/M/microcode.html Published: No later than May 30, 2016.*

Intel® 64 and IA-32 Architectures Software Developer's Manual vol. 3A: System Programming Guide, Part 1 Intel Order No. 253668-031US p. [2-10]-[2-25]; [4-1]-[4-8]; [9-11]-[9-20]; [18-1]-[18-3] (Year: 2009).*

"Big.LITTLE" Wikipedia. Downloaded Mar. 13, 2013 from http://en.wikipedia.org/wiki/Big.Little pp. 1-3.

Greenhalgh, Peter. "Big.LITTLE Processing with ARM Cortex™-A15 & Cortex-A7" White Paper, ARM. Sep. 2011 pp. 1-8. Downloaded Mar. 13, 2013 from http://www.arm.com/files/downloads/big.LITTLE_Final.pdf.

David Jackson, Evolution of Processor Microcode, IEEE Transactions on Evolutionary Computation, vol. 9, No. 1, Feb. 2005, pp. 1-12.

Summons to attend Oral Proceedings mailed in cognate EP application 14160950.3 on May 14, 2019, Munich, Germany, pp. 1-7, Reference # P122871EP00 AMS.

Tong Li, Paul Brett, Rob Knauerhase, David Koufaty, Dheeraj Reddy, and Scott Hahn, Dperating System Support for Overlapping-ISA Heterogeneous Multi-Core Architectures, 2009, pp. 1-14.

* cited by examiner

ASYMMETRIC MULTI-CORE PROCESSOR WITH NATIVE SWITCHING MECHANISM

CROSS REFERENCE TO RELATED APPLICATION(S)

This application claims priority based on U.S. Provisional Application Ser. No. 61/805,225, filed Mar. 26, 2013, entitled ASYMMETRIC MULTI-CORE PROCESSOR WITH NATIVE SWITCHING MECHANISM, which is hereby incorporated by reference in its entirety.

BACKGROUND

A computing architecture referred to as "big.LITTLE" has recently been introduced by ARM® Holdings, with its head office in Cambridge, England. In one example of a big.LITTLE system, a "big," i.e., higher performance and power consuming Cortex-A15 processor is paired with a "LITTLE," i.e., lower performance and power consuming Cortex-A7 processor. The system switches back and forth between executing a thread on the two processors based on the computational intensity of the thread. If the thread is computationally intensive, execution is switched to the Cortex-A15 processor, whereas when the thread is not computationally intensive, execution is switched to the Cortex-A7 processor. By doing so, the goal is achieve near the performance of the Cortex-A15 processor while consuming power somewhere between the typical power consumption of the respective Cortex-A7 and Cortex-A15 processors. This is particularly desirable in battery-powered platforms that demand a wide range of performance, such as smart phones.

An ARM white paper by Peter Greenhalgh entitled, "Big.LITTLE Processing with ARM Cortex™-A15 & Cortex-A7," published in September 2011, states that the Cortex-A15 and Cortex-A7 processors are architecturally identical and indicates this is an important paradigm of big.LITTLE. More specifically, both processors fully implement the ARM v7A architecture. (For example, the Cortex-A7 implements the Virtualization and Large Physical Address Extensions of the ARM v7A architecture.) Consequently, both processors can execute all instructions of the architecture, although a given instruction may execute with different performance and power consumption on the two processors. The operating system decides when to switch between the two processors to try to match the performance required by the currently executing application.

One limitation of the big.LITTLE approach is that it requires full architectural compatibility between the two processors. This may be significant, particularly when the architecture includes instructions that necessitate a significant number of transistors. For example, even the minimum hardware required to implement single instruction multiple data (SIMD) instructions may be considerable, even if, for example, the LITTLE processor includes simplified hardware that serializes the processing of individual elements of data within a SIMD instruction. Generally, the appearance of these instructions in an application highly correlates to the need for high performance by the application. Consequently, it is unlikely the simplified SIMD hardware in the LITTLE processor will be used for any significant time since it likely will quickly fail to meet the performance requirements of the application and a switch to the big processor will occur. Thus, the simplified implementation of the SIMD hardware in the LITTLE processor will be wasted.

Another limitation of the big.LITTLE approach is that it may require changes to the operating system to make decisions about switching between the processors and coordinating the switches. It may be difficult to persuade the developer of the operating system to include such specialized code tailored to a particular implementation, particularly a proprietary operating system developer.

Another drawback of the big.LITTLE approach is that the portion of the operating system that determines when to switch between big and little is consuming bandwidth on the currently running processor and taking bandwidth away from the application. That is, the switch code is not running in parallel to the application, it is running instead of the application.

Another drawback of the big.LITTLE approach is it appears there are some applications for which it is very difficult to develop effective switch code. That is, it is difficult for the operating system to know when to make switches in a manner that does not either consume significantly more power than necessary (i.e., run big too long) or provide poor performance (i.e., run LITTLE too long).

BRIEF SUMMARY

In one aspect the present invention provides a processor having an instruction set architecture (ISA) that includes a set of features. The processor includes first and second processing cores configured to support first and second respective subsets of features of the ISA feature set. The first subset of supported features is less than all the features of the ISA feature set. The first and second subsets of supported features are different from one another. The union of the first and second subsets of supported features is all the features of the ISA feature set. The first core is configured to detect that a thread, while being executed by the first core rather than by the second core, attempted to employ a feature of the ISA feature set that is not included in the first subset of supported features and, in response, to indicate a switch from the first core to the second core to execute the thread.

In another aspect, the present invention provides a method performed by a processor having an instruction set architecture (ISA) that includes a set of features and having first and second processing cores. The method includes detecting that a thread, while being executed by the first core rather than by the second core, attempted to employ a feature of the ISA feature set that is not included in a first subset of supported features of the ISA feature set. The first core is configured to support the first subset of features. The first subset is less than all the features of the ISA feature set. The second core is configured to support a second subset of features of the ISA feature set. The first and second subsets of supported features are different from one another. The union of the first and second subsets of supported features is all the features of the ISA feature set. The method also includes switching execution of the thread to the second core rather than the first core in response to the detecting.

In yet another aspect, the present invention provides a processor. The processor includes at least two processing cores. One of the cores is configured to execute a thread by consuming less power but with lower performance than the other cores. The processor is configured to detect an event that indicates a switch from executing on a first of the cores to a second of the cores. The processor is configured to transfer a state of the thread from the first core to the second core automatically in response to detecting the event rather than in response to being instructed by architectural software executing on the first core to transfer the state of the thread from the first core to the second core.

In yet another aspect, the present invention provides a method performed by a processor having at least two processing cores, wherein one of the cores is configured to execute a thread by consuming less power but with lower performance than the other cores. The method includes the processor detecting an event that indicates a switch from executing on a first of the cores to a second of the cores. The method also includes the processor transferring a state of the thread from the first core to the second core automatically in response to the detecting the event rather than in response to being instructed by architectural software executing on the first core to transfer the state of the thread from the first core to the second core.

DETAILED DESCRIPTION OF THE EMBODIMENTS

Glossary

Figure 1:
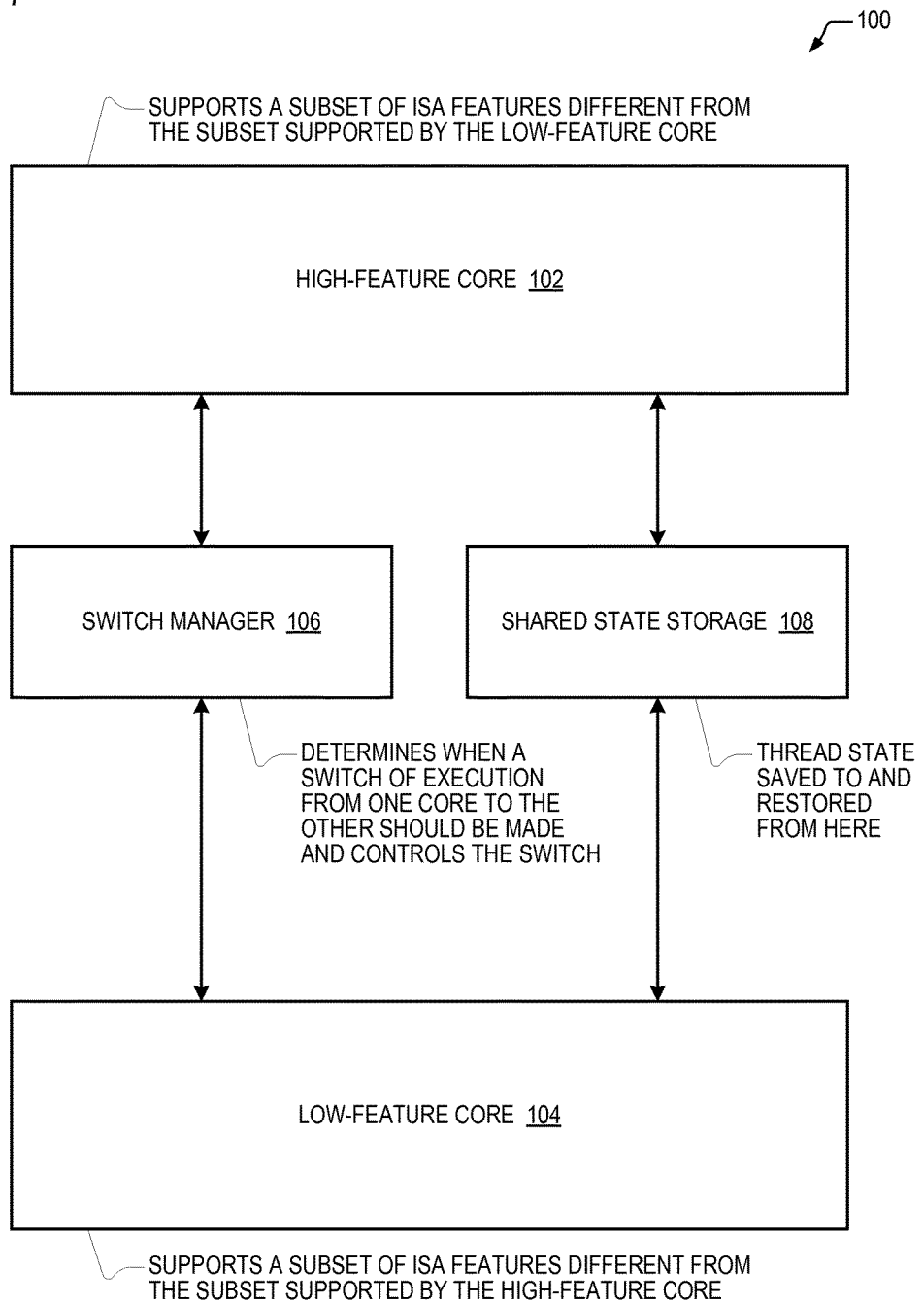
FIG. 1 is a block diagram illustrating an embodiment of an asymmetric multi-core processor.

An instruction set architecture (ISA), in the context of a family of processors, comprises: (1) an instruction set, (2) a set of resources (e.g., registers and modes for addressing memory) accessible by the instructions of the instruction set, and (3) a set of operating modes in which the processor operates to process the instructions of the instruction set, e.g., 16-bit mode, 32-bit mode, 64-bit mode, real mode, protected mode, long mode, virtual 8086 (VM86) mode, compatibility mode, Virtual Machine eXtensions (VMX) mode and system management mode (SMM). The instruction set, resource set and operating modes are included in the feature set of the ISA. Because a programmer, such as an assembler or compiler writer, who wants to generate a machine language program to run on a processor family requires a definition of its ISA, the manufacturer of the processor family typically defines the ISA in a programmer's manual. For example, at the time of its publication, the Intel 64 and IA-32 Architectures Software Developer's Manual, March 2009 (consisting of five volumes, namely Volume 1: Basic Architecture; Volume 2A: Instruction Set Reference, A-M; Volume 2B: Instruction Set Reference, N-Z; Volume 3A: System Programming Guide; and Volume 3B: System Programming Guide, Part 2), which is hereby incorporated by reference herein in its entirety for all purposes, defined the ISA of the Intel 64 and IA-32 processor architecture, which is commonly referred to as the x86 architecture and which is also referred to herein as x86, x86 ISA, x86 ISA family, x86 family or similar terms. For another example, at the time of its publication, the ARM Architecture Reference Manual, ARM v7-A and ARM v7-R edition Errata markup, 2010, which is hereby incorporated by reference herein in its entirety for all purposes, defined the ISA of the ARM processor architecture, which is also referred to herein as ARM, ARM ISA, ARM ISA family, ARM family or similar terms. Other examples of well-known ISA families are IBM System/360/370/390 and z/Architecture, DEC VAX, Motorola 68k, MIPS, SPARC, PowerPC, and DEC Alpha. The ISA definition covers a family of processors because, over the life of the ISA processor family, the manufacturer may enhance the ISA of the original processor in the family by, for example, adding new instructions to the instruction set and/or new registers to the architectural register set. To clarify by example, as the x86 ISA evolved it introduced in the Intel Pentium III processor family new SSE instructions and a set of 128-bit XMM registers as part of the SSE extensions, and x86 ISA machine language programs have been developed to utilize the SSE instructions and XMM registers to increase performance, although x86 ISA machine language programs exist that do not utilize the XMM registers of the SSE extensions. Furthermore, other manufacturers have designed and manufactured processors that run x86 ISA machine language programs. For example, Advanced Micro Devices (AMD) and VIA Technologies have added new features, such as the AMD 3DNOW! SIMD vector processing instructions and the VIA Padlock Security Engine random number generator and advanced cryptography engine features, each of which are utilized by some x86 ISA machine language programs but which are not implemented in current Intel processors. To clarify by another example, the ARM ISA originally defined the ARM instruction set state, having 4-byte instructions. However, the ARM ISA evolved to add, for example, the Thumb instruction set state with 2-byte instructions to increase code density and the Jazelle instruction set state to accelerate Java bytecode programs, and ARM ISA machine language programs have been developed to utilize some or all of the other ARM ISA instruction set states, although ARM ISA machine language programs exist that do not utilize the other ARM ISA instruction set states.

An instruction set defines the mapping of a set of binary encoded values, which are machine language instructions, to operations the processor performs. Illustrative examples of the types of operations machine language instructions may instruct a processor to perform are: add the operand in register 1 to the operand in register 2 and write the result to register 3, subtract the immediate operand specified in the instruction from the operand in memory location 0x12345678 and write the result to register 5, shift the value in register 6 by the number of bits specified in register 7, branch to the instruction 36 bytes after this instruction if the zero flag is set, load the value from memory location 0xABCD0000 into register 8. Thus, the instruction set defines the binary encoded value each machine language instruction must have to cause the processor to perform the desired operation. It should be understood that the fact that the instruction set defines the mapping of binary values to processor operations does not imply that a single binary value maps to a single processor operation. More specifically, in some instruction sets, multiple binary values may map to the same processor operation.

A thread is a sequence, or stream, of program instructions. A thread is also referred to herein as a program thread. In the context of the present disclosure, a program thread is fetched from memory based on the architectural program counter of a core (e.g., x86 instruction pointer (IP) or ARM program counter (PC)), as opposed to a microcode routine that is fetched based on a non-architectural microcode program counter of the core.

Architectural software is a program from which a thread emanates. Examples of architectural software are common software applications, such as a word processor or spreadsheet program, as well as system software, such as BIOS or an operating system.

Microcode is instructions fetched from a non-architectural memory of the processor based on a non-architectural microcode program counter of the core, as opposed to architectural software that is fetched based on the architectural program counter of the core.

An ISA feature set had by a processor is the set of features specified by the ISA that the processor supports. The features may include the instruction set of the ISA supported by the processor, the set of operating modes of the ISA supported by the processor and/or the set of resources of the ISA included by the processor. The features may also include different paging modes supported by the processor. As discussed above, a given model of a processor in an ISA processor family may support fewer than all the features defined by the ISA.

A processing core, or core, is a hardware apparatus that processes data in response to executing instructions of a program thread. The instructions are of an instruction set defined by the ISA of the processor that comprises the core. However, as described herein, a processing core may not support, i.e., may not be able to execute, all the instructions of the ISA instruction set. Furthermore, a processing core may not support all the modes, i.e., may not be able to operate in, all the modes specified by the ISA. Generally, the processing core may not support all the features of the ISA, but may instead support a subset of features of the ISA feature set.

A thread state is all the state necessary for the cores to execute the thread. A thread state is also referred to as an execution state. The state necessary for the cores to execute the thread is dictated by both the particular ISA and the microarchitecture of the cores. Although the subsets of ISA features supported by the cores are different and the microarchitectures of the cores may be different, the cores must at least include the state needed by the cores to execute the thread. For illustration purposes, the thread state includes at least the architectural state of the thread as defined by the ISA. For example, the architectural registers—which includes the program counter, general-purpose registers and control registers necessary to describe the configuration of the core—are included in the thread state. Additionally, non-architectural state may be included in the thread state. Again, for illustration purposes, the non-architectural thread state may include temporary registers storing intermediate results of implementing microinstructions.

In the context of the asymmetric multi-core processors described herein, an ISA feature is unsupported by a core, or not included in the subset of features of the ISA feature set supported by the core, if the core does not perform the feature the thread is attempting to employ as defined by the ISA and indicates a switch to the other core. In the case of an instruction the core does not support, the core does not execute the instruction when it encounters the instruction. For example, if the core does not support an I/O instruction (e.g., the x86 IN or OUT instructions), the core does not perform the semantic of the I/O instruction and indicates a switch to the other core. It is noted that because the union of the subsets of features supported by the cores of the asymmetric multi-core processor is the entire ISA feature set, at least one of the cores will support the instruction. In the case of an operating mode the core does not support, the core does not enter or exit the specified operating mode when instructed to do so and indicates a switch to the other core. For example, if the core does not support a particular bit-width operating mode (e.g., the x86 64-bit mode, also referred to as "long mode") and the thread attempts to enter the bit-width mode (e.g., by writing a value specified by the ISA to a control register specified by the ISA), the core does not enter the mode and indicates a switch to the other core. Again, it is noted that because the union of the subsets of features supported by the cores of the asymmetric multi-core processor is the entire ISA feature set, at least one of the cores will support the operating mode.

Referring now to FIG. 1, a block diagram illustrating an embodiment of an asymmetric multi-core processor 100 is shown. The processor 100 includes a feature set of an instruction set architecture (ISA). The ISA may be an existing ISA, including any of those mentioned above, or may be an ISA developed in the future.

The processor 100 includes a high-feature core 102 (or high core 102) and a low-feature core 104 (or low core 104) each coupled to a switch manager 106 and a shared state storage 108. Relative to the low-feature core 104, the high-feature core 102 provides higher performance of a thread and consumes more power when executing the thread; conversely, relative to the high-feature core 102, the low-feature core 104 provides lower performance of a thread and consumes less power when executing the thread. In this sense, the cores 102/104 are asymmetric. The power/performance asymmetry is primarily due to differences between the cores 102/104 at a micro-architectural level. For example, the cores 102/104 may have different cache memory sizes and/or different cache hierarchies, in-order vs. out-of-order execution, different branch prediction mechanisms, different composition of execution units, scalar vs. superscalar instruction issue, speculative vs. non-speculative execution, and so forth. The power/performance differences do not affect the correct execution of a thread by the processor 100. Correct thread execution means the processor 100 generates the results that would follow from the execution of the thread from a given starting state according to the ISA of processor 100. The performance of a core executing a thread is the rate at which the core executes instructions of the thread. The performance may be measured in instructions per second or other suitable means.

Additionally, the low core 104 and high core 102 are asymmetric in the sense that they support different subsets of features of the ISA feature set. However, collectively the low core 104 and high core 102 support the ISA feature set. This is accomplished as follows. When one of the cores 102/104 is executing a thread and the thread attempts to employ a feature not included in the subset of features supported by the core 102/104, the switch manager 106 switches execution of the thread to the other core 102/104, which includes a transfer of the thread state to the other core 102/104. This is described in more detail herein. In some embodiments, the subset of features supported by the high core 102 includes all of the features of the ISA and the subset of features supported by the low core 104 includes less than all of the features of the ISA. Conversely, in other embodiments, the subset of features supported by the high core 102 includes less than all of the features of the ISA and the subset of features supported by the low core 104 includes all of the features of the ISA. Furthermore, in some embodiments, the subset of features supported by the high core 102 includes less than all of the features of the ISA and the subset of features supported by the low core 104 is less than all of the features of the ISA. However, in all embodiments, the union of the two subsets is all of the features of the ISA. Advantageously, embodiments in which one or both of the cores 102/104 support less than all the ISA feature set potentially enable the cores 102/104 to be an even lower power implementation than they would be if they had to support the entire ISA feature set.

With this approach, conceptually, the determination regarding whether the low-feature core 104 or the high-feature core 102 executes the thread is made, at least in part, at the time the processor 100 is designed. That is, broadly speaking, the high-feature core 102 supports features of the ISA generally associated with providing high performance, whereas the low-feature core 104 supports features generally associated with lower performance. This "lack" of feature support facilitates knowing when to effect a thread execution switch, rather than involving the operating system.

The switch manager 106 is native to the processor 100, i.e., it is part of the processor 100, rather than being architectural software, such as an operating system, as in conventional approaches. In some embodiments, the native switch manager 106 comprises an "uncore" state machine. In other embodiments, the native switch manager 106 comprises a discrete third processing core that consumes very low power and executes its own code separate from the code executed by the cores 102/104. For example, the discrete switch manager 106 may comprise a service processor that also performs debug and power management services for the processor 100. Advantageously, the discrete switch manager 106 does not consume processing bandwidth of the currently executing core 102/104. In alternate embodiments, such as those described below, the switch manager 106 is integrated into both the low-feature core 104 and the high-feature core 102, such as comprising microcode that executes on the cores 102/104.

Preferably, in addition to accomplishing an execution switch when the thread attempts to employ an ISA feature unsupported by the currently executing core 102/104, the switch manager 106 also monitors utilization of the currently executing core 102/104. When the switch manager 106 detects the high-feature core 102 is being under-utilized, it switches execution of the thread to the low-feature core 104. Conversely, when the switch manager 106 detects the low-feature core 104 is being over-utilized, it switches execution of the thread to the high-feature core 102. The switch manager 106 potentially has greater insight into the utilization of the cores 102/104 and is able to make switch decisions more effectively and quickly than the operating system as in conventional approaches.

The shared state storage 108 is used by the cores 102/104 to transfer thread state from one core 102/104 to the other core 102/104 during a switch of execution of the thread. More specifically, the currently executing core 102/104 saves the thread state from itself to the shared state storage 108, and the core 102/104 to which execution is being switched subsequently restores to itself the thread state from the shared state storage 108. Preferably, the shared state storage 108 is a private, non-architectural random access memory (RAM), such as a static RAM, that is shared and accessible by both cores 102/104, although other forms of storage may be employed. In an alternate embodiment, the shared state storage 108 is system memory.

Figure 2:
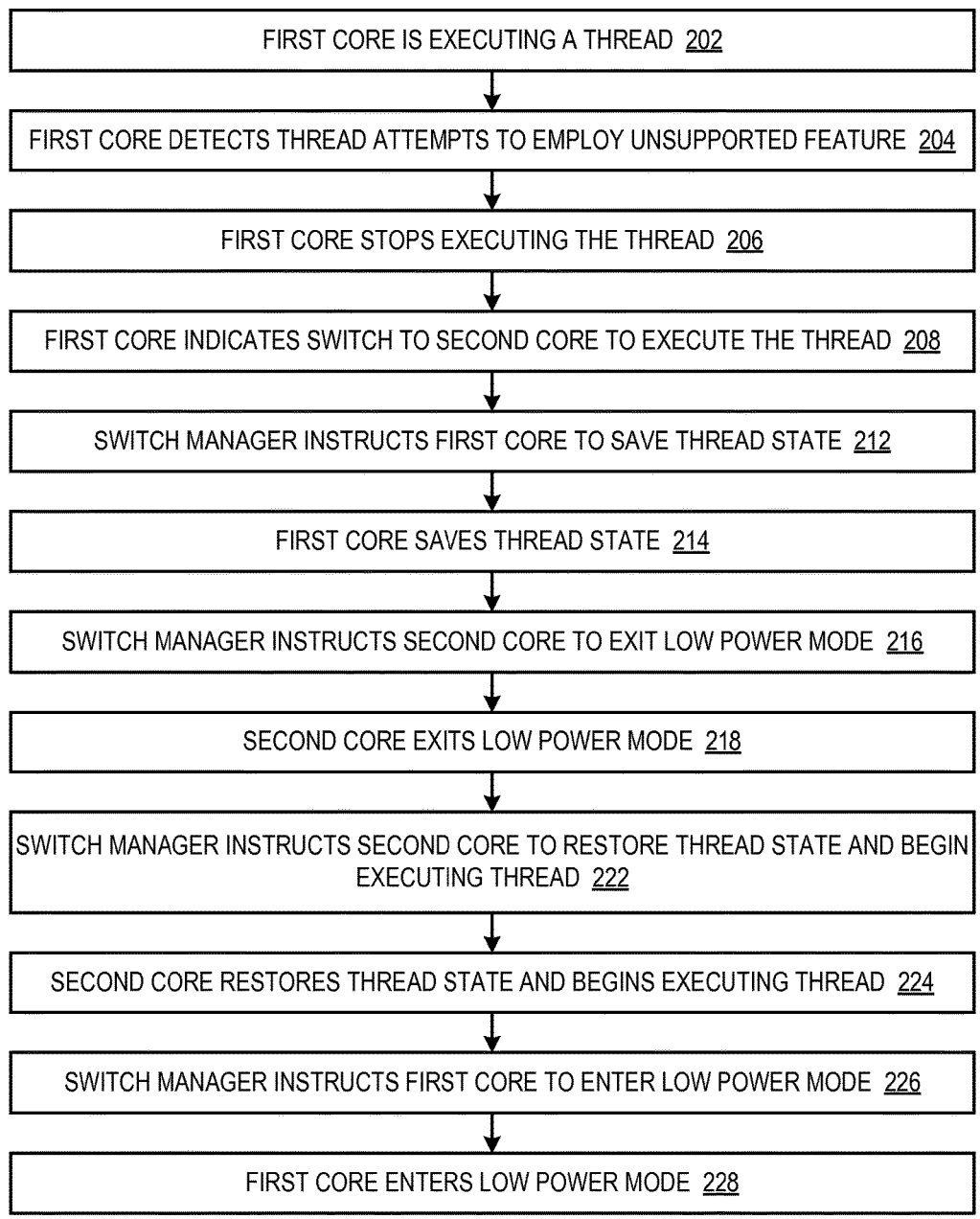
FIGS. 2 and 3 are flowcharts illustrating operation of the processor of FIG. 1.

Referring now to FIG. 2, a flowchart illustrating operation of the processor 100 of FIG. 1 is shown. Flow begins at block 202.

At block 202, a first of the asymmetric cores 102/104, i.e., low core 104 or high core 102, of FIG. 1 is executing an application thread. Flow proceeds to block 204.

At block 204, the first core 102/104, which is currently executing the thread, detects that the thread is attempting to employ a feature of the ISA feature set that is unsupported by the first core 102/104, i.e., a feature that is not included in the subset of features of the ISA features set supported by the first core 102/104. Depending upon the nature of the particular unsupported feature, the first core 102/104 may detect the unsupported feature in different ways. For example, an instruction decoder may decode an instruction that is unsupported by the first core 102/104, or an execution unit may detect that an instruction is attempting to access a control register that is unsupported by the first core 102/104 or a particular control register bit or field that is unsupported by the first core 102/104, e.g., to place the core 102/104 into a particular operating mode defined by the ISA. Flow proceeds to block 206.

At block 206, the first core 102/104 stops executing the thread in response to detecting the attempt by the thread to employ the unsupported feature at block 204. For example, if the instruction decoder decodes an unsupported instruction, it may trap to a microcode routine that handles illegal instruction exceptions, and the microcode routine may stop the execution of subsequent instructions of the thread. For another example, if the execution unit detects that an instruction is attempting to access an unsupported control register or bit or field, it may trap to a microcode routine that stops execution of subsequent instructions of the thread. Flow proceeds to block 208.

At block 208, the first core 102/104 indicates a switch to the second core 102/104 to execute the thread. In one embodiment, a microcode routine, such as described above with respect to block 206, indicates the switch. Alternatively, a hardware state machine of the first core 102/104 indicates the switch. Preferably, the first core 102/104 signals the switch manager 106 to indicate the need to make the switch. Flow proceeds to block 212.

At block 212, the switch manager 106 instructs the first core 102/104 to save the state of the thread. Preferably, the switch manager 106 signals to the first core 102/104 to save the thread state. Flow proceeds to block 214.

At block 214, the first core 102/104 saves the thread state to the shared state storage 108. In addition to the thread state, the first core may also transfer other state that is not necessary for the second core 102/104 to execute the thread, but which may nevertheless enable the second core 102/104 to execute the thread faster, such as some or all of the contents of one or more cache memories of the first core 102/104. Flow proceeds to block 216.

At block 216, the switch manager 106 instructs the second core 102/104 to exit low power mode. The second core 102/104 is in a low power mode because it was told to enter the low power mode at block 228 during a previous instance of the process of FIG. 2 when the second core 102/104 was in the role of the first core 102/104, i.e., when the second core 102/104 detected an attempt by the thread to employ an ISA feature unsupported by the second core 102/104 and was instructed by the switch manager 106 to enter low power mode at block 228. A low power mode is a mode a core enters in which it consumes less power than when it is actively executing a thread. Examples of low power modes include: a mode entered by the core in response to an instruction that instructs the core to halt execution of the thread; a mode in which the external bus clock to the processor is disabled; a mode in which the core disables the clock signals to a portion of its circuitry; a mode in which the core disables power to a portion of its circuitry. The low power modes may include the well known Advanced Configuration and Power Interface (ACPI) Processor states, more commonly known as C-states. Preferably, the switch manager 106 signals to the second core 102/104 to exit low power mode. In one embodiment, the signal may cause a non-architectural interrupt to the second core 102/104 that wakes it up, e.g., restores power and clocks. The interrupt may invoke a microcode routine that performs actions associated with exiting the low power mode. Flow proceeds to block 218.

At block 218, the second core 102/104 exits the low power mode and enters a running mode. The running mode is a mode in which a core executes instructions. The running mode may include the well known ACPI Performance states, more commonly known as P-states. In one embodiment, the particular running mode is programmable, for example by system software, via a control register of the processor 100, to facilitate tuning of the performance vs. power characteristic of the processor 100. Flow proceeds to block 222.

At block 222, switch manager 106 instructs the second core 102/104 to restore the thread state and begin executing the thread. Preferably, the switch manager 106 signals the second core 102/104 which causes a non-architectural interrupt to the second core 102/104 that is serviced by microcode of the second core 102/104. Flow proceeds to block 224.

At block 224, the second core 102/104 restores the thread state, which was saved by the first core 102/104 at block 214, from the shared state storage 108. In one embodiment, the interrupt received at block 222 invokes a microcode routine in the second core 102/104 that restores the thread state from the shared state storage 108. Flow proceeds to block 226.

At block 226, the switch manager 106 instructs the first core 102/104 to enter a low power mode. In one embodiment, the particular low power mode is programmable—for example by system software, via a control register of the processor 100—from among multiple low power modes supported by the first core 102/104 in order to facilitate tuning of the performance vs. power characteristic of the processor 100. Flow proceeds to block 228.

At block 222, the first core 102/104 enters the low power mode as instructed at block 226. Flow ends at block 228.

It should be understood that although the blocks of the embodiment of FIG. 2 are described in a particular order, some blocks may be performed in a different order and/or in parallel with one another. For example, the operations at blocks 222 and 226 may occur in the opposite order if it is considered more important to reduce power consumption than to increase performance. For another example, in one embodiment, the operation at block 216 may occur before the operation at block 214 completes so that the operations of blocks 214 and 218 may occur substantially in parallel in order to more quickly get the second core 102/104 executing the thread. Similarly, in one embodiment, the operation at block 226 may occur before the operation at block 224 completes so that the operations of blocks 224 and 228 may occur substantially in parallel in order to reduce power consumption. For yet another example, the operations at blocks 212 and 216 may occur in the opposite order if it is considered more important to reduce power consumption than to increase performance.

Figure 3:
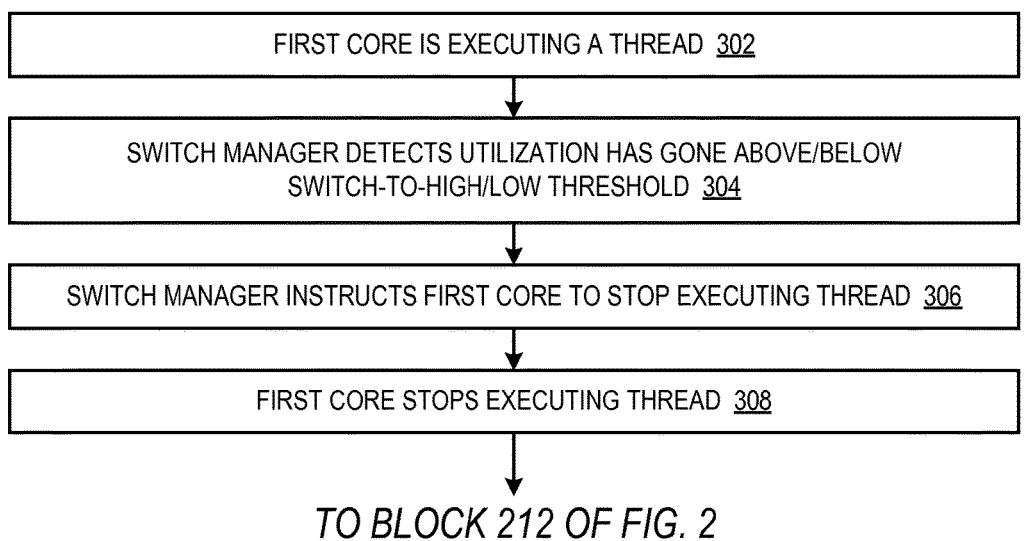

Referring now to FIG. 3, a flowchart illustrating operation of the processor 100 of FIG. 1 is shown. Flow begins at block 302.

At block 302, a first of the asymmetric cores 102/104, i.e., low core 104 or high core 102, of FIG. 1 is executing an application thread. Flow proceeds to block 304.

At block 304, the switch manager 106 detects utilization of the core 102/104 has gone above or below a respective switch-to-high threshold or switch-to-low threshold. That is, if the low core 104 is the currently executing core, the switch manager 106 detects utilization has gone above a threshold that indicates the low core 104 is being over-utilized and a switch to the high core 102 is preferable; whereas, if the high core 102 is the currently executing core, the switch manager 106 detects utilization has gone below a threshold that indicates the high core 102 is being under-utilized and a switch to the low core 104 is preferable. Preferably, the switch-to-high threshold value is larger than the switch-to-low threshold value, which provides a hysteresis affect to avoid overly frequent switches. Preferably, the utilization threshold values are programmable, e.g., by system software, to facilitate tuning of the switching algorithm.

The utilization of a core 102/104 is a measure of an amount the core 102/104 is being used to execute a thread. Utilization may be determined in various ways. In some embodiments, the utilization is based on the rate of retired instructions. The cores 102/104 may include a counter that increments by the number of instructions retired in a given clock cycle and which is periodically reset. In some embodiments, the utilization is based on the amount of time spent in a running state as opposed to the amount of time spent in an inactive state. A running state is a state in which the core 102/104 is executing instructions, whereas in an inactive state the core 102/104 is not executing instructions. For example, the inactive states may correspond to, or include, the low power modes described above, e.g., halted execution, disabled clocks, disabled power, etc., such as entering a C-state other than C0. The cores 102/104 may include counters that count the time spent in the running states and the time spent in the each of the various inactive states. The cores 102/104 may include free-running counters that run even when clocks and/or power to other parts of the core 102/104 are disabled in order to keep track of real time. Preferably, the utilization may be determined over a most recent predetermined period of time that may be programmable, e.g., by system software, to facilitate tuning of the switching algorithm. The counters of the first core 102/104 are accessible by the switch manager 106 to enable it to determine the utilization. Flow proceeds from block 304 to block 306.

At block 306, the switch manager 106 instructs the first core 102/104 to stop executing the thread. Preferably, the switch manager 106 sends a signal to the first core 102/104 to stop executing the thread, which interrupts the first core 102/104 causing a microcode routine to be invoked on the first core 102/104 that causes the first core 102/104 to stop executing the thread at block 308. Flow proceeds to block 308.

At block 308, the first core 102/104 stops executing the thread. Preferably, the first core 102/104 attains a quiescent condition so that it can subsequently save the thread state at block 214 of FIG. 2. Flow proceeds from block 308 to block 212 and performs blocks 212 through 228 of FIG. 2.

Figure 4:
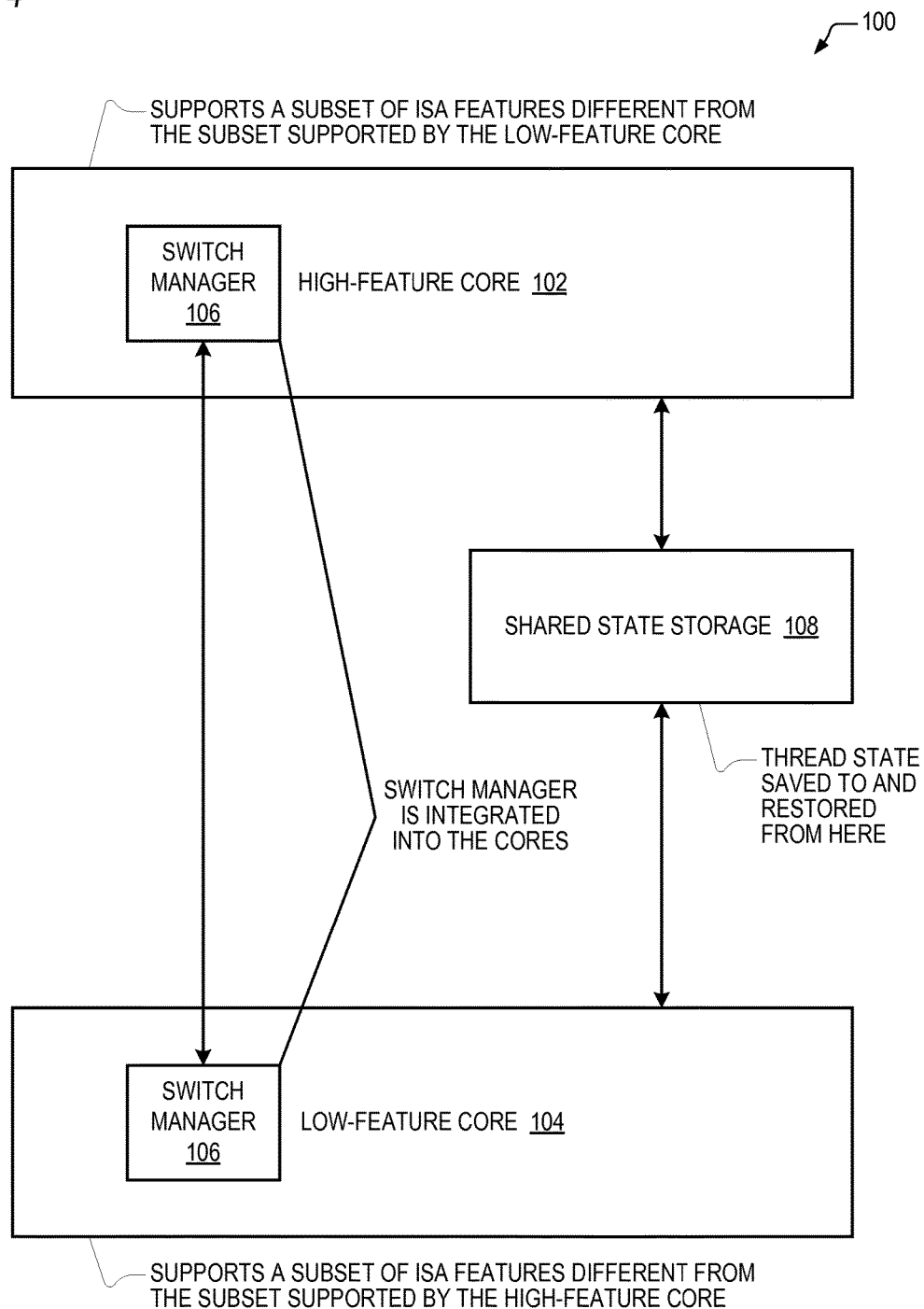
FIG. 4 is a block diagram illustrating an embodiment of an asymmetric multi-core processor having the switch manager integrated into the asymmetric cores according to an alternate embodiment.

Referring now to FIG. 4, a block diagram illustrating an embodiment of an asymmetric multi-core processor 100 having the switch manager integrated into the asymmetric cores 102/104 is shown. The processor 100 of FIG. 4 is similar in most respects to the processor 100 of FIG. 1; however, in the embodiment of FIG. 4, the switch manager 106 is integrated into the cores 102/104, rather than being a discrete entity outside the cores 102/104. In the integrated switch manager 106 embodiments, the portion of the switch manager 106 in the first core 102/104 effectively indicates to itself to make the switch at block 208, instructs itself to save the thread state at block 212, signals to the second core 102/104 to exit low power mode at block 216, instructs the second core 102/104 to restore the thread state and begin executing the thread at block 222, and instructs itself to enter low power mode at block 228. Furthermore, preferably an algorithm similar to those described with respect to block 304 of FIG. 3 is employed to determine whether a switch is needed due to under/over-utilization regardless of whether it is being performed by a discrete switch manager 106 or an integrated switch manager 106. In one embodiment, the cores 102/104 include hardware state machines that perform the switching algorithm determination in parallel with the execution of the thread. In other embodiments, microcode performs the switching determination algorithm, e.g., in response to a periodic timer interrupt. Alternatively, the microcode may determine the utilization each time it is invoked when the core 102/104 transitions from a running state to an inactive state and vice versa. Although the microcode-implemented integrated switch manager 106 embodiments imply consuming a portion of the core's instruction execution bandwidth, they may still provide a performance advantage over conventional approaches in which the operating system is the switch decision maker, as well as the other advantages described herein.

Figure 5:
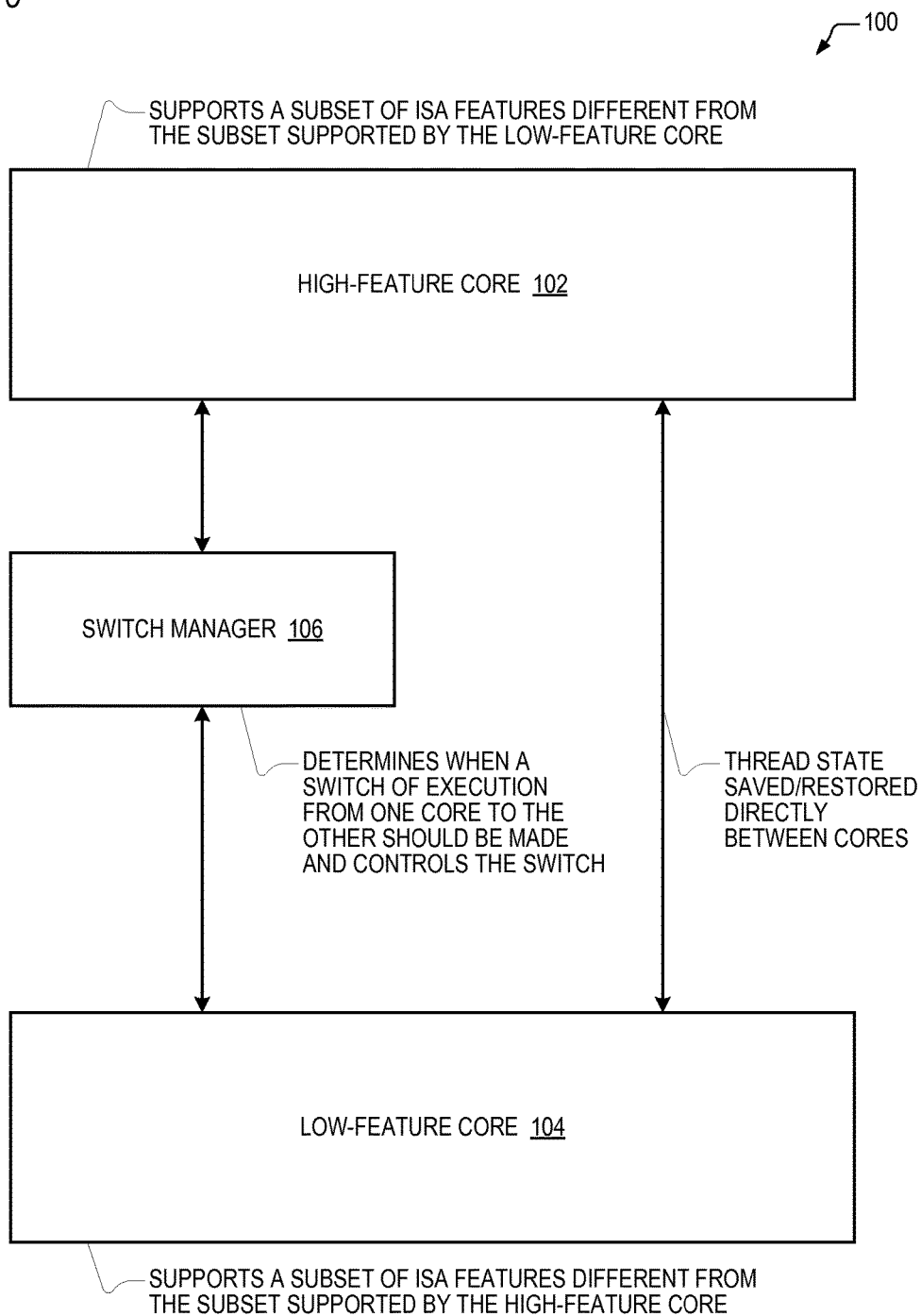
FIG. 5 is a block diagram illustrating an embodiment of an asymmetric multi-core processor in which the asymmetric cores directly transfer thread state as part of an execution switch according to an alternate embodiment.

Referring now to FIG. 5, a block diagram illustrating an embodiment of an asymmetric multi-core processor 100 in which the asymmetric cores 102/104 directly transfer thread state as part of an execution switch is shown. The processor 100 of FIG. 5 is similar in most respects to the processor 100 of FIG. 1; however, in the embodiment of FIG. 5, the processor 100 does not include the shared state storage 108 of FIG. 1, and the low core 104 and high core 102 directly transfer thread state as part of an execution switch as described in more detail with respect to FIG. 6.

Figure 6:
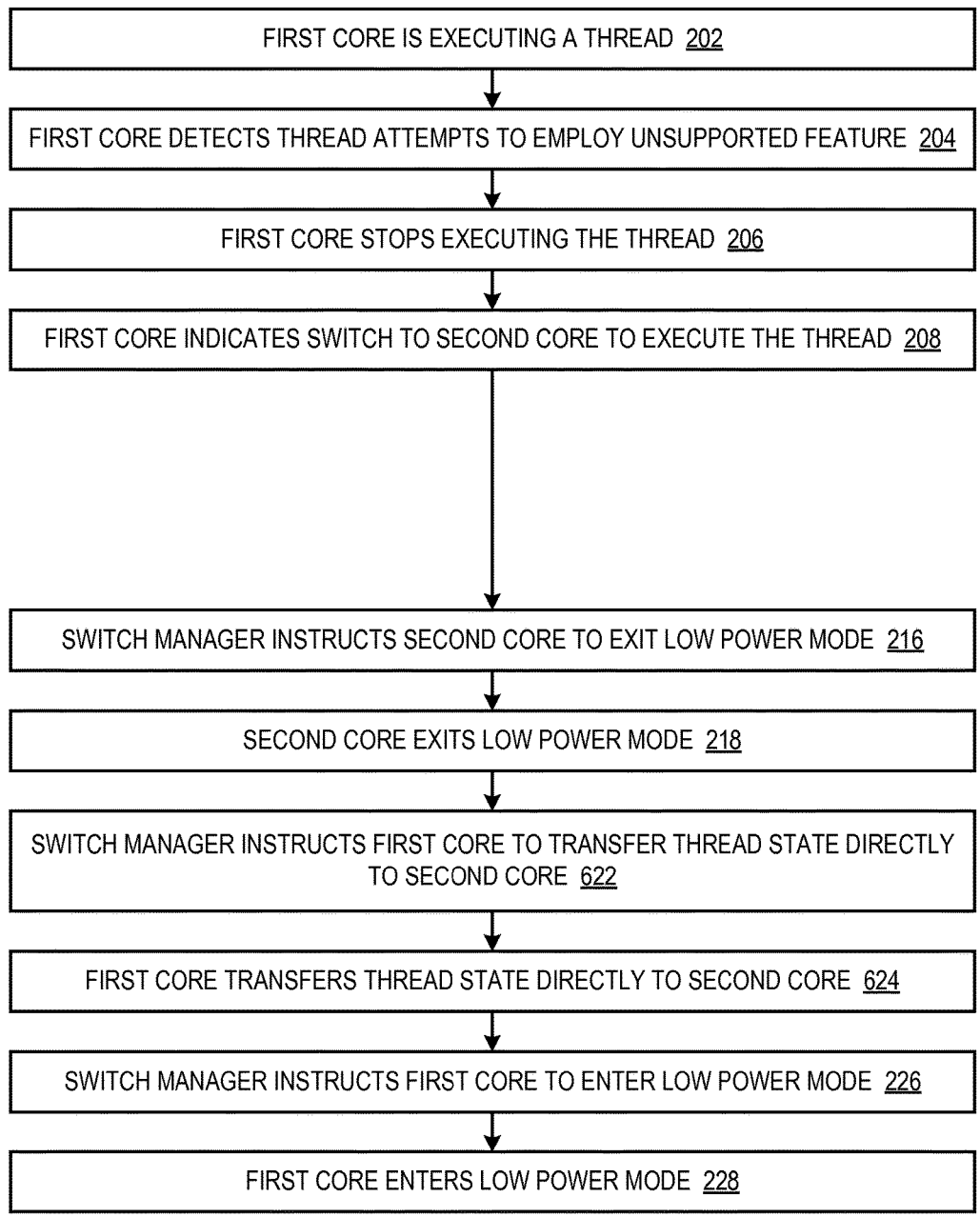
FIG. 6 is a flowchart illustrating operation of the processor of the embodiment of FIG. 5.

Referring now to FIG. 6, a flowchart illustrating operation of the processor 100 of the embodiment of FIG. 5 is shown. The flowchart of FIG. 6 is similar to the flowchart of FIG. 2 in many respects; however, the flowchart of FIG. 6 is absent blocks 212 and 214 such that flow proceeds from block 208 to block 216; additionally, blocks 222 and 224 are replaced with blocks 622 and 624, respectively, such that flow proceeds from block 218 to block 622, from block 622 to block 624, and from block 624 to block 226.

At block 622, the switch manager 106 instructs the first core 102/104 to transfer the thread state directly to the second core 102/104. In addition to the thread state, the first core 102/104 may also transfer other state that is not necessary for the second core 102/104 to execute the thread, but which may nevertheless enable the second core 102/104 to execute the thread faster, such as some or all of the contents of one or more cache memories of the first core 102/104. Flow proceeds to block 624.

At block 624, the first core 102/104 saves the thread state directly to the second core 102/104. Flow proceeds to block 226.

It should be understood that the direct thread state saving embodiment of FIGS. 5 and 6 may be employed in an embodiment having a discrete switch manager 106 (e.g., of FIG. 1) and an embodiment having an integrated switch manager 106 (e.g., of FIG. 4).

Figure 7:
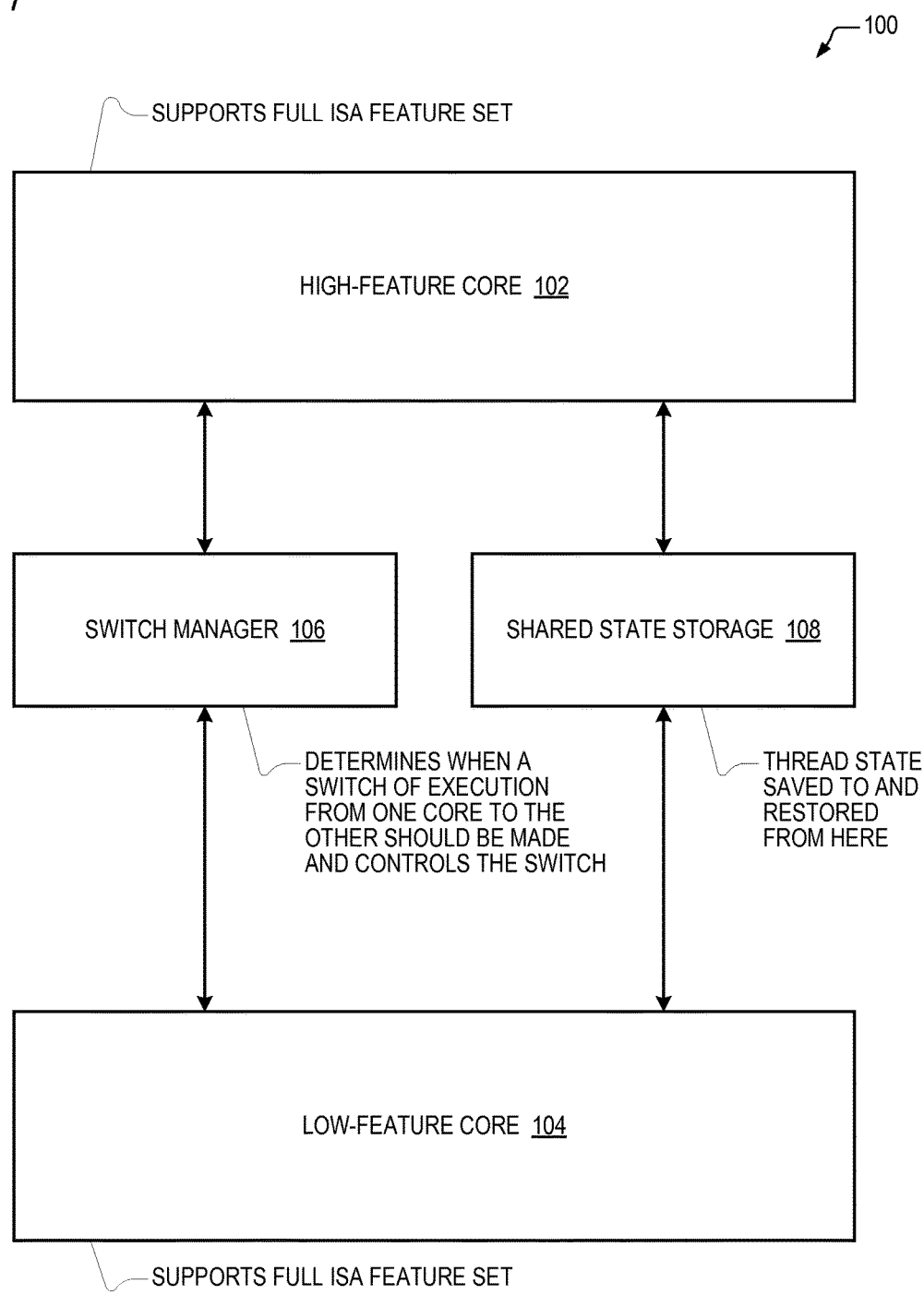
FIG. 7 is a block diagram illustrating an embodiment of an asymmetric multi-core processor according to an alternate embodiment.

Referring now to FIG. 7, a block diagram illustrating an embodiment of an asymmetric multi-core processor 100 is shown. The processor 100 of FIG. 7 is similar to the processor 100 of FIG. 1, namely the low core 104 provides lower performance and consumes less power than the high core 102; however, in the embodiment of FIG. 7, both the low core 104 and the high core 102 support the full ISA feature set (unlike the embodiment of FIG. 1 in which the low core 104 and high core support different subsets of the ISA feature set). In the embodiment of FIG. 7, the operation described with respect to FIGS. 2 and 6 are essentially irrelevant, i.e., execution switches are not be made based on attempts by the thread to employ an unsupported feature, nevertheless, the native switch manager 106 performs the switching, rather than the operating system as in conventional approaches. Thus, the advantages of the native switch manager 106 may be appreciated.

Embodiments are described herein that advantageously do not require architectural software that consumes execution bandwidth of the cores to determine when a switch should be made. This performance advantage is achieved in exchange for the cost of additional hardware on the processor to make this determination, which in turn may consume additional power.

Another advantage afforded by embodiments in which the processor itself detects the need to switch is that it ameliorates other problems associated with the conventional method that requires the system software to do so. More specifically, the system software need not be modified to enjoy the benefits of the asymmetric multi-core processor embodiments, namely the reduced power consumption at near the performance of the high core. This may be particularly advantageous in the case of proprietary operating systems.

Another advantage afforded by embodiments described herein is that because the low-feature core and the high-feature core collectively support the ISA feature set but individually support only a subset of it, each core may potentially individually consume less power than it would if it supported the entire ISA feature set.

Although embodiments have been described in which the multi-core processor has a single pair of asymmetric cores, other embodiments are contemplated in which the processor includes more than two cores in which at least one of the cores is asymmetric to the others, and other embodiments are contemplated which may include multiple pairs of asymmetric cores.

Furthermore, although embodiments have been described in which a switch is performed when either (1) the thread attempts to employ an unsupported feature, or (2) the low core is being over-utilized or the high core is being under-utilized, other embodiments are contemplated in which a switch may be performed when the thread attempts to employ a supported feature, yet the feature is highly correlated to threads that have a performance requirement that is more closely related to the other core. For example, assume the high core is currently executing in the widest bit operating mode and the thread changes away to a narrower bit operating mode that is highly correlated to threads that have a lower performance requirement; then, a switch to the low core may be performed. In one embodiment, the switch manager causes the switch only if the high core's current utilization is not too great, e.g., not above a programmable predetermined threshold.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a processor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a processor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A processor having an instruction set architecture (ISA) which supports a set of features including a wide bit-width operating mode and a narrow bit-width operating mode, wherein the wide bit-width operating mode is wider than the narrow bit-width operating mode and wherein the ISA specifies a particular value to be written to an identified control register in order to set the current bit-width operating mode of a processing core, the processor comprising:
   a first processing core configured to support the wide bit-width operating mode and the narrow bit-width operating mode;
   a second processing core configured to support at least the narrow bit-width operating mode and configured to execute a thread by consuming less power but with lower performance than the first processing core; and
   a switch manager integrated into the first processing core configured to:
      detect a thread fetched by the first core has switched from the wide bit-width operating mode to the narrow bit-width operating mode by detecting the particular value being written into the identified control register by the thread;
      cause, in response to the detecting, microcode in the first processing core to save an execution state of the thread from the first core to a state storage and instruct the second core to retrieve the saved execution state so that execution can continue by the second processing core; and
      instruct the first processing core to enter a low power mode subsequent to instructing the second core.

2. The processor of claim 1, wherein the second processing core is further configured to exit a low power mode prior to retrieving the execution state of the thread.

3. A method performed by a processor having an instruction set architecture (ISA) which supports a set of features including a wide bit-width operating mode and a narrow bit-width operating mode and having first and second processing cores, wherein the wide bit-width operating mode is wider than the narrow bit-width operating mode and the ISA specifies a particular value to be written to an identified control register in order to set the current bit-width operating mode of a processing core, and wherein the first core is configured to support the wide and the narrow bit-width operating modes and the second core is configured to support at least the narrow bit-width operating mode and to execute a thread by consuming less power but with lower performance than the first core, the method comprising:
   detecting, by switch manager logic integrated in the first processing core, that a thread executing on the first core has changed from the wide bit-width operating mode to the narrow bit-width operating mode by detecting the particular value being written into the identified control register by the thread, and in response to said detecting:
      executing microcode in the first processing core to save current execution state of the thread to a shared state storage memory,
      executing microcode in the second processing core to retrieve the saved execution state, in order to transfer the execution of the thread from the first core to the second core, and
      instructing the first processing core to enter a low power mode.

4. The method of claim 3, further comprising:
   detecting, by switch manager logic integrated in the second processing core, that utilization of the second processing core has gone above a threshold while executing the thread; and
   responsively causing the second processing core to save current execution state of the thread to the shared state storage memory, and causing the first processing core to retrieve the saved execution state of the thread in order to transfer the thread state to the first core to continue to execute the thread.

5. A processor having an instruction set architecture (ISA) which supports a set of features including a wide bit-width operating mode and a narrow bit-width operating mode, wherein the wide bit-width operating mode is wider than the narrow bit-width operating mode and the ISA specifies a particular value to be written to an identified control register in order to set the current bit-width operating mode of a processing core, the processor comprising:
   a first processing core configured to support the wide bit-width operating mode and the narrow bit-width operating mode;
   a second processing core configured to support at least the narrow bit-width operating mode and configured to execute a thread by consuming less power but with lower performance than the first processing core; and
   a switch manager integrated into the first and second processing cores configured to:
      detect a thread fetched by the first core has switched from the wide bit-width operating mode to the narrow bit-width operating mode by detecting the particular value being written into the identified control register by the thread;
      cause, in response to the detecting, microcode in the first processing core to directly transfer an execution state of the thread from the first core to the second core so that execution of the thread can continue by the second processing core; and instruct the first processing core to enter a low power mode subsequent to the transfer of the execution state.

6. The processor of claim 5, wherein the switch manager is further configured to detect that utilization of the second processing core has gone above a threshold while executing the thread and responsively cause microcode in the second core to directly transfer the thread's execution state from the second core to the first core in order to continue to execute the thread on the first core.

7. The processor of claim 5, wherein the second processing core is further configured to exit a low power mode prior to resuming execution of the thread.

8. A method performed by a processor having an instruction set architecture (ISA) which supports a set of features including a wide bit-width operating mode and a narrow bit-width operating mode and having first and second processing cores, wherein the wide bit-width operating mode is wider than the narrow bit-width operating mode and the ISA specifies a particular value to be written to an identified control register in order to set the current bit-width operating mode of a processing core, and wherein the first core is configured to support the wide and the narrow bit-width operating modes and the second core is configured to support at least the narrow bit-width operating mode and to execute a thread by consuming less power but with lower performance than the first core, the method comprising:

detecting, by switch manager logic integrated in the first processing core, that a thread executing on the first core has changed from the wide bit-width operating mode to the narrow bit-width operating mode by detecting the particular value being written into the identified control register by the thread, and in response to said detecting:

executing microcode in the first processing core to directly transfer the thread's execution state from the first core to the second core in order to transfer the execution of the thread from the first core to the second core, and instructing the first processing core to enter a low power mode.

9. The method of claim 8, further comprising:

detecting, by switch manager logic integrated in the second processing core, that utilization of the second processing core has gone above a threshold while executing the thread; and responsively executing microcode in the second core to directly transfer the thread's execution state from the second core to the first processing core in order to continue to execute the thread on the first core.

\* \* \* \* \*